Patented Apr. 21, 1953

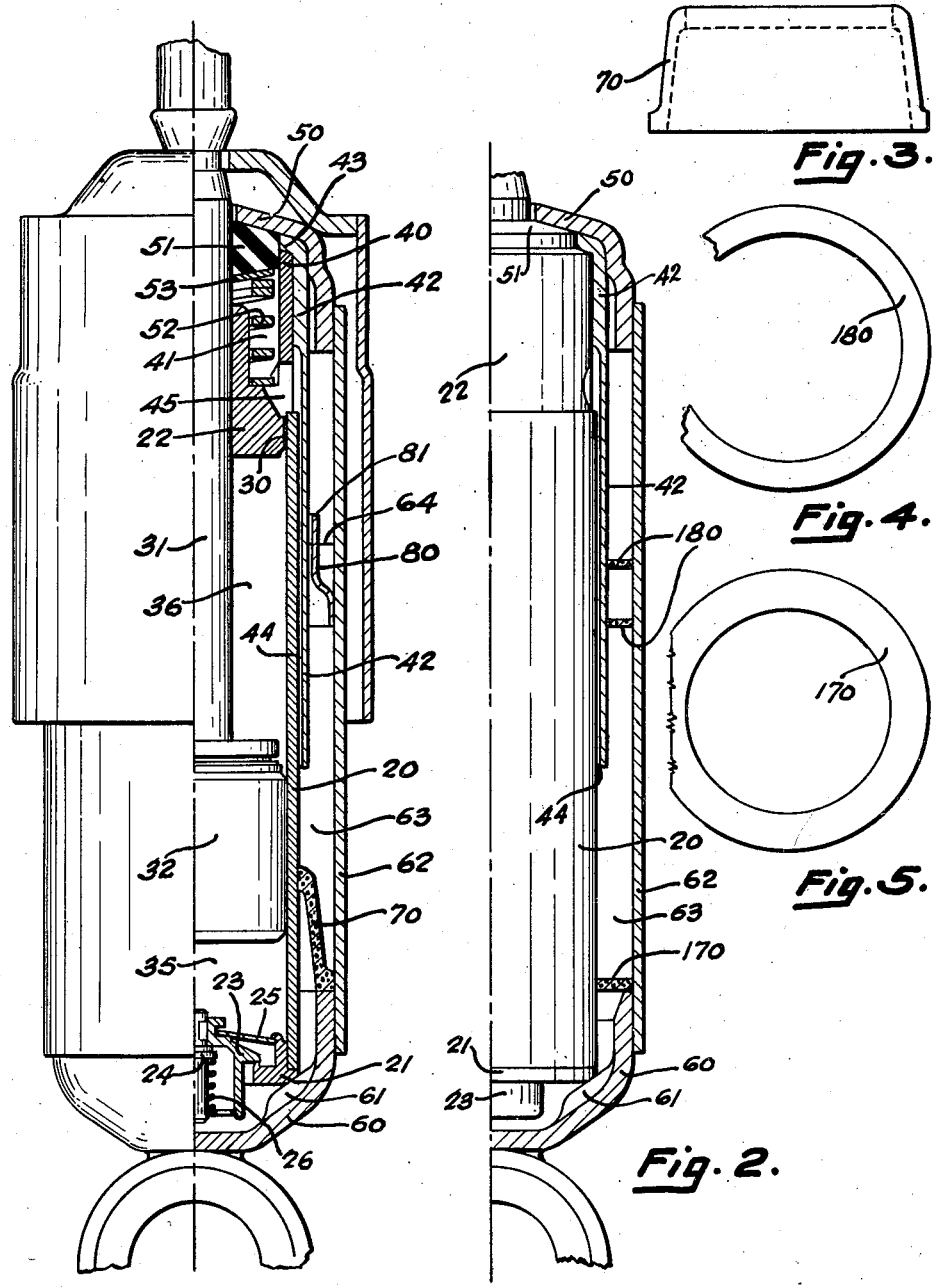

2,635,715

UNITED STATES PATENT OFFICE 2,635,715

HYDRAULIC SHOCK ABSORBER

Walter W. Riedel and John T. Marvin, Dayton, Ohio, assignors to General Motors Corporation, Detroit, Mich., a corporation of Delaware Application August 6, 1948, Serial No. 42,953

4 Claims. (Cl. 188—100)

This invention relates to improvements in direct acting, hydraulic shock absorbers.

It is among the objects of the present invention to maintain the full efficiency of a direct acting, hydraulic shock absorber by providing it with means for removing air from the fluid within the shock absorber whereby substantially air free fluid is available to be drawn into the working chamber of the cylinder of the device.

A further object of the present invention is to substantially prevent the agitation of the fluid within the reservoir of a direct acting, hydraulic shock absorber while said shock absorber is being shaken during its operation on a motor vehicle on which said shock absorber is installed, thereby preventing the mixture of fluid in the reservoir and air trapped in the extreme upper portion of the reservoir and above the level of the fluid therein, which mixture, if permitted, greatly reduces the efficiency of the device.

For purposes of this description the word "fluid" is used in its more limited sense and is intended to define a liquid.

Further objects and advantages of the present invention will be apparent from the following description, reference being had to the accompanying drawings wherein a preferred embodiment of the present invention is clearly shown.

In the drawings:

Fig. 1 is a side view, partly in section, of a direct acting, hydraulic shock absorber equipped with the present invention.

Fig. 2 is a half sectional view of the shock absorber shown in Fig. 1, equipped, however, with a modified construction of the present invention.

Fig. 3 is a detail view of the filter element.

Fig. 4 is a detail view of the fluid movement retarding element shown in Fig. 2.

Fig. 5 is a view of the modified form of filter element.

A direct acting, hydraulic shock absorber as shown in Fig. 1, is particularly adapted to be secured between the frame and axle of a motor vehicle for purposes of controlling the approaching and separating movements of said frame and axle as the vehicle is being operated over a roadbed. If the roadbed is comparatively smooth, no appreciable movement of the axles or frame of the vehicle occurs and consequently little movement of the shock absorber obtains. However, if the vehicle is being operated over a rough highway in which numerous ruts and humps are met by the road wheels of the vehicle, the axles are lowered and raised irregularly through a greater range and with more force resulting in a similar frame action. Under these conditions the shock absorber is likewise violently shaken and consequently the fluid therein greatly agitated. The agitated fluid in the reservoir of the shock absorber will have the air in the top of the reservoir mix therewith causing the fluid supply to become aerated. When aerated fluid, a compressible medium, is drawn into the working cylinder of the shock absorber, its efficiency drops appreciably for a non-compressible medium is necessary in said working cylinder to effect fully efficient operation of the shock absorber.

The present invention has for its object the removal of air from the greater portion of the fluid supply in a shock absorber so that only comparatively air free fluid, a non-compressible medium, is always available to be drawn into the working cylinder.

To obtain a comparatively air free fluid supply, especially adjacent the intake area of the working cylinder the present invention provides two elements in the fluid reservoir of the cylinder. The one element is a filter, preferably consisting of sintered, non-compacted powdered metal having such flow characteristics as to permit normal action of the shock absorber, said element acting as a unidirectional filter which permits the air charged fluid to pass therethrough in one direction but only the fluid in the opposite direction, the air in the fluid about to enter the filter in said opposite direction being checked and caused to rise to the fluid level in the reservoir.

A filter having the flow characteristics as above defined and referred to in the claims as one made from "sintered non-compacted powdered metal," may be made from an intimate mixture of any suitable metal powder consisting of at least two metals having different melting points in which the metal having the highest melting point predominates. The article formed from this non-compacted metal powder is then sintered at a temperature below the melting point of the metal powder having the highest melting point and above the melting point of the metal powder having the lowest melting point, such sintering being done under suitable conditions of atmosphere and for a time sufficient to cause intermetallic diffusion or bonding. In this manner a highly porous mass is formed having interconnecting pores providing tortuous paths therethrough. The effective porosity may be controlled by the particle size of the metal powder used. Thus, suitable porosity for accomplishing the objects heretofore stated may be attained by any one skilled in the art whereby passage of liquids having different viscosities may be controlled as desired. The second element is a baffle placed under the normal level of the fluid in the reservoir, which baffle retards fluid agitation caused by the shaking of the shock absorber and thus greatly reduces the mixing of the air in the top area of the reservoir with the fluid therein. This baffle practically eliminates fluid agitation between the filter and the baffle element and if any fluid is agitated by shaking of the shock absorber it is the small volume of fluid above the baffle.

Referring to the drawings the numeral 20 designates the working cylinder of the shock absorber, said cylinder having a closure member 21 at one end and a closure member 22 at its opposite end. Closure member 21 provides two oppositely acting valves 23 and 24, valve 23 being normally urged upon its seat by a spring finger 25 while valve 24 is normally urged upon its seat by a coil spring 26. The closure member 22 telescopically fits the cylinder 20, the annular surface fitting into the cylinder having a plurality of comparatively shallow grooves 30. A central opening in closure member 22 provides a slidable support for the piston rod 31, the end of which, extending into the cylinder, having the piston 32 attached thereto. This piston is of standard construction having suitable valve mechanism therein which controls the transfer of fluid between the lower working chamber 35 in the cylinder and the upper working chamber 36 and vice versa. Closure member 22 also has a cylindrical extension 40, forming a chamber 41 on the side of the closure member opposite the cylinder. A tube 42 fits snugly about the cylindrical extension 40 of the closure member and has an inwardly extending annular flange 43 resting upon the outer annular edge of said extension. This tubular member 42 surrounds the cylinder 20 for a portion of its length, providing a narrow annular space 44 about said cylinder. This annular space 44 is in communication with the chamber 41 above the closure member 22 by an opening 45 in the side wall of said closure member.

A cover cap 50 fits about the tubular member 42 adjacent its upper end, said cover cap 50 having a central opening through which the piston rod 31 extends to the exterior of the shock absorber. A resilient packing 51 encircles the piston rod 31 and engages the inner surfaces of the cover cap 50, the annular flange 43 of the tube 42 and a portion of the inner surface of the cylindrical extension 40 of the end closure member. A coil spring 52 is interposed between the bottom of the chamber 41 and an abutment ring 53, engaging the packing 51, said spring yieldably urging the resilient packing 51 into sealing engagement with the rod 31, the cover cap 50, the tube 42 and the cylindrical extension 40 of the end closure member 22, thereby substantially preventing fluid leaks from the chamber 41 at these points of contact.

Another end cover cap 60 is provided at the bottom end of the shock absorber, said cover cap having spaced, radial ribs 61 in its inner surface upon which the cylinder assembly rests. An outer tube 62 fits about both end cover caps 50 and 60 and is secured thereto in any suitable manner as for instance by welding. This tube 62, surrounding the cylinder and spaced therefrom, forms an annular space 63 around the cylinder referred to as the fluid containing reservoir. It will be noted that reservoir 63 is in communication with the valve mechanism in the lower closure member 21 through the space between the cylinder and closure member 60 provided between the radial ribs 61. It will also be noted that the reservoir is also in communication with the working chamber 36 of the cylinder by way of the annular space 44, between the cylinder 20 and tube 42, the opening 45 in the end closure member and the comparatively shallow grooves 30 in the outer peripheral surface of said closure member. The normal level of the fluid in the reservoir 63 is substantially at the line 64.

A filter 70 is mounted in the reservoir of the shock absorber. This filter as shown in Fig. 3 is frustoconically shaped, the upper portion thereof fitting about the cylinder 20, the lower portion fitting into the reservoir tube 62 thereby providing an annular partition in the reservoir. This filter may be of any suitable shape and of any suitable porous material. The filter preferably is made of sintered, non-compacted metal powder capable of permitting the fluid to pass therethrough substantially as freely as passed through either one of the valves 23 or 24 of the shock absorber.

A sintered, noncompacted powdered metal filter as used in the present instance may have its flow characteristics changed by varying the area of the filter, by varying the thickness of the material, by varying the size of the metal particles from which the filter is made or by equalization of any two or more of these variables.

Specifically the filter may be made in accordance with the teachings of Davis, Koehring or Olt as set forth in their Patents No. 2,157,596 and 2,220,641, 2,198,702 and 2,273,589 respectively. The particular composition of the filter may vary and is limited only to materials which are not attacked by or do not deleteriously affect the shock absorber fluid. For example, the filter may be bronze, copper-nickel, iron, iron-copper, nickel or alloys thereof and in fact any metal which meets the aforementioned restrictions. The specific material from which the filter is made and the methods by which it is made form no part of the invention.

The Figs. 1 and 3 show the filter to be of frustoconical shape thereby increasing the area of the filter. It can readily be seen that this frustoconical filter as shown in Figs. 1 and 3 may even be longer to increase the area or on the other hand, may be shortened to decrease the area if conditions permit.

In Fig. 2 the filter 170 is shown in the form of a ring fitting about the cylinder 20 and within the outer reservoir tube 62. In all instances the baffle rings are placed below and close to the normal level of the fluid in the shock absorber. The baffle ring 80 in the Fig. 1 has its greater portion beneath the fluid level 64, the longer cylindrical portion of said baffle slightly extending above the fluid.

When oil is placed within the shock absorber at the time of assembly it may be charged with air. As has been stated heretofore, a shock absorber of this type is connected between the frame and axle of a motor vehicle when applied thereto. As the frame and axle approach each other the piston 32 is moved downwardly into the cylinder 20 and exerts a pressure on the fluid in the working chamber 35. Some of this fluid passes through the piston 32 into the upper chamber 36. Due to the presence of the piston rod 31 in chamber 36 not all the fluid displaced from chamber 35 as the piston 32 moves downwardly may be received by the upper chamber, thus, fluid pressure is exerted upon the valve 24 moving it against the effect of its spring 26 to establish a restricted flow from the chamber 35 past the valve 24, into the fluid reservoir 63 via the clearance spaces in the end cap 60. If air is present in the fluid in chamber 35 the medium therein is compressible which is very undesirable in a shock absorber and to maintain its highest efficiency it is necessary that the medium in the working chamber of the cylinder be incompressible. Therefore if any air is in the fluid it is essential that it be removed therefrom. As the fluid is forced past valve 24 into the reservoir it will be forced through the filter 70. The filter 70 is so constructed that it will pass fluid or air under pressure as freely as does either one of the valves 23 or 24. After this air laden fluid is forced through the filter 70, under pressure, most of the air therein will rise passing through the space between the baffle ring 80 and the baffle tube 42 into the reservoir portion above the level of the fluid therein where said air will be trapped in the space between the cover cap 59 and the baffle tube 42.

When the frame and axle of a vehicle separate a reverse piston action obtains. Now the piston 32 moves upwardly in the cylinder toward the end closure member 22 exerting a pressure upon the fluid within the chamber 36. If there is any air in this fluid it will rise to the top and be forced through the narrow passages 30 in the end closure member due to the pressure of the piston upon said fluid. After passing through the passages 30 the air will be forced through the opening 45 down through the annular space 44 between the baffle ring and the cylinder and be ejected into the fluid in the reservoir into which said baffle tube 42 dips, the air then rising to the upper level in said reservoir. As the piston 32 moves upwardly and exerts a pressure on the fluid in the upper chamber 36 said fluid will be transferred through the piston 32 into the lower chamber 35. Due to the presence of the rod 31 in the upper chamber the fluid transferred from the upper to the lower chamber will not be sufficient to fill the chamber and thus a replenishing flow of fluid past valve 23 will be made from the reservoir. As this flow is established a downward movement of the fluid in the reservoir obtains. The characteristics of the filter 70 are such that the fluid may flow therethrough substantially as freely as it does past the valve 23 and thus the function of valve 23 will not be affected. If the fluid above the filter 70 is charged with air, said air will be checked when reaching the filter. The fluid will pass through the filter but the checked air will accumulate and rise through the fluid in the reservoir to the normal level thereof and be trapped in the upper portion of the reservoir above the baffle ring 80. The normal action of air in fluid is to rise to the surface and thus as the downwardly moving fluid, if aerated, engages the filter said filter will have a squeezing or separating action due to the capillary nature of its pores which tends to cause the air globules to accumulate on its outer surface and eventually rise to the surface level of the fluid in the reservoir. Therefore filter 70 acts as a unidirectional filter. The aerated fluid, forced by piston pressure upwardly through the filter 70, will pass therethrough comparatively freely. On the other hand any aerated fluid, if present above the filter 70, will, when the fluid starts to move downwardly due to differential pressure caused by the piston 32 moving upwardly, be broken up, the filter tending to separate the air from the fluid and permitting the fluid to enter and pass through the filter and cause the air to accumulate and rise in the reservoir. The filter 170 in Fig. 2 will function in an identical manner.

During its operation on a motor vehicle and particularly when the motor vehicle is being operated over a comparatively rough highway the shock absorber is violently shaken and consequently the fluid therein will likewise be shaken and agitated. If, due to such shaking, the fluid is permitted to be violently agitated in the reservoir there is a tendency for the air in the upper portion of the reservoir to mix with the fluid and thus if the shaking is persistent and of long duration, the supply of fluid within the reservoir may become completely aerated. In order to impede such fluid agitation, due to violent shaking of the shock absorber, applicant provides baffle rings preferably placed below the level of the fluid and forming a restriction in the reservoir which will impede fluid movement especially fluid movement caused by the shaking of the shock absorber which movement is generally violent and sudden. The baffle rings shown in Fig. 1 function in a manner similar to those shown in Fig. 2. These baffle rings hold the fluid, between the rings and the filter substantially calm and unagitated while permitting the smaller amount of fluid above the baffle ring to be agitated due to shaking of the shock absorber. By holding the fluid between the baffle ring and filter comparatively placid during violent shaking of the shock absorber a substantially air free supply of fluid adjacent the filter and particularly adjacent the valved intake of the cylinder is practically assured.

From the aforegoing it will be seen that applicants have equipped a shock absorber with dual means, one, for removing air mixed with the fluid in the shock absorber, the other, for dampening fluid movement in the shock absorber due to the violent shaking thereof during operation, thereby substantially eliminating the aeration of the fluid in response to such shaking.

While the embodiment of the present invention as herein disclosed, constitutes a preferred form, it is to be understood that other forms might be adopted.

What is claimed is as follows:

1. An hydraulic shock absorber comprising in combination, two concentric tubes, one providing a working cylinder, the other a fluid containing reservoir around the cylinder, both tubes having closure members at each end; a piston in the cylinder; fluid flow control valves in the one cylinder closure member, said valves being in communication with the reservoir at its lower end; a frusto-conically shaped separator in the reservoir, fitting both the cylinder and the reservoir tubes, said separator being made of a sintered, non-compacted powdered metal, said separator having such a porosity that air and fluid may be forced at greater than atmospheric pressure from the cylinder through the separator with a predetermined constant restriction offered by the separator and substantially only fluid passed at substantially atmospheric pressure through the separator from the reservoir toward the cylinder, the separator holding back the air as the fluid from the reservoir enters the separator, said checked air rising to the level of the fluid in the reservoir.

2. An hydraulic shock absorber comprising in combination, a cylinder containing a reciprocative piston; a fluid reservoir in communication with said cylinder into which fluid from the reservoir is transferred at atmospheric pressure and from which fluid is forced into the reservoir at greater than atmospheric pressure; and a separator between the reservoir and cylinder, said separator being made of a sintered, non-compacted powdered metal, said separator having such a porosity that air charged fluid may be forced at greater than atmospheric pressure from the cylinder, through said separator into the reservoir and substantially only fluid may pass through said separator from the reservoir to the cylinder at substantially atmospheric pressure, during which time the air in said fluid is restrained by the separator and caused to accumulate and rise to the surface of the fluid in the reservoir.

3. An hydraulic shock absorber comprising in combination, a cylinder containing a reciprocative piston; a fluid containing reservoir in communication with said cylinder for delivering fluid at greater than atmospheric pressure to and receiving fluid at substantially atmospheric pressure from said reservoir as the piston is reciprocated; a separator in the reservoir, said separator consisting of a sintered, non-compacted powdered metal partition across the reservoir beneath the normal level of the fluid therein, said partition providing multiple, permanent tortuous paths the porosity of said partition being such that air laden fluid may be forced through at greater than atmospheric pressure, said separator in one direction, the air in the fluid being restrained and only substantially air free fluid being passed by said separator in the opposite direction at substantially atmospheric pressure.

4. An hydraulic shock absorber comprising in combination, a cylinder containing a reciprocative piston; a fluid containing reservoir in communication with said cylinder for delivering fluid to and receiving fluid from said reservoir as the piston is reciprocated; a separator partition in said reservoir beneath the level of the fluid therein, said separator being made of a sintered, non-compacted powdered metal providing a myriad of permanent, tortuous paths, said separator having such a porosity that air laden fluid may be forced therethrough at greater than atmospheric pressure from the cylinder into the reservoir and passing only substantially air free fluid from the reservoir toward the cylinder at substantially atmospheric pressure, during which time the air is restrained by the separator after accumulating thereon, rising to the level of the fluid in said reservoir.

WALTER W. RIEDEL.
JOHN T. MARVIN.

References Cited in the file of this patent

UNITED STATES PATENTS

| Number | Name | Date |
|---|---|---|
| 439,695 | See | Nov. 4, 1890 |
| 1,628,900 | Neilsen | May 17, 1927 |
| 1,698,640 | Lovejoy | Jan. 8, 1929 |
| 1,749,609 | Royce | Mar. 4, 1930 |
| 1,785,814 | Kreider | Dec. 23, 1930 |
| 1,812,519 | Eckhard | June 30, 1931 |
| 2,138,513 | Rossman et al. | Nov. 29, 1938 |
| 2,157,596 | Davis | May 9, 1939 |
| 2,220,641 | Davis | Nov. 5, 1940 |
| 2,346,602 | O'Bannon | Apr. 11, 1944 |
| 2,360,755 | Boor | Oct. 17, 1944 |
| 2,379,750 | Rossman | July 3, 1945 |
| 2,388,253 | Federighi | Nov. 6, 1945 |

FOREIGN PATENTS

| Number | Country | Date |
|---|---|---|
| 25,388 | Australia | 1930 |
| 525,636 | France | June 13, 1921 |